Dec. 13, 1932.   J. O. WEBB   1,890,836
GLOBE VALVE
Filed May 12, 1931

Inventor
J. O. Webb

By Watson E. Coleman
Attorney

Patented Dec. 13, 1932

1,890,836

UNITED STATES PATENT OFFICE

JOHN O. WEBB, OF TULSA, OKLAHOMA

GLOBE VALVE

Application filed May 12, 1931. Serial No. 536,893.

This invention relates to valves and more particularly to globe valves, though the principle of the invention may be applied to various forms of valves and to valves used for various purposes.

The general object of the invention is to provide a valve of this character wherein the valve proper does not rotate into contact with its seat, but moves vertically downward or upward, thus doing away with any friction between the valve proper and the seat of the valve, thus preventing the valve and seat from twisting upon and cutting each other out.

My invention is illustrated in the accompanying drawing, wherein:—

Figure 1:
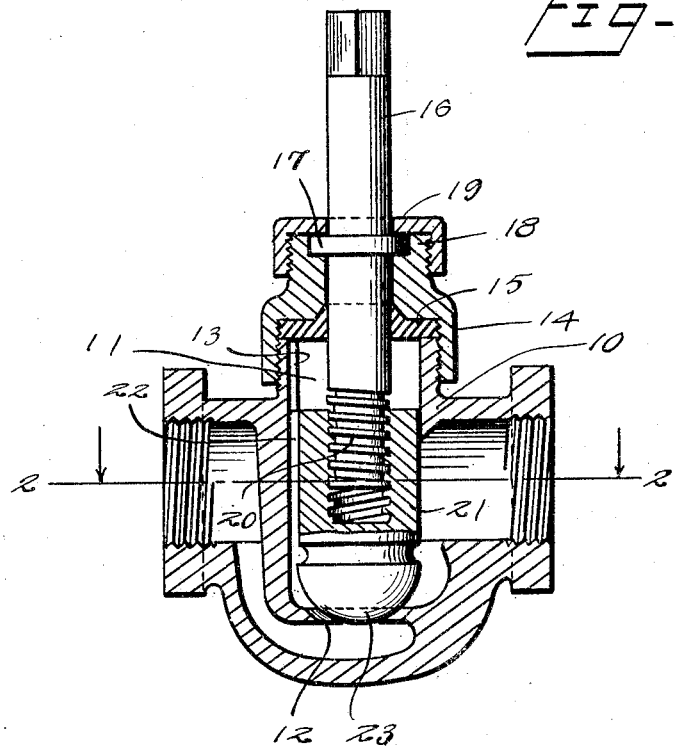
Figure 1 is a vertical sectional view through a valve constructed in accordance with my invention.
Figure 2:
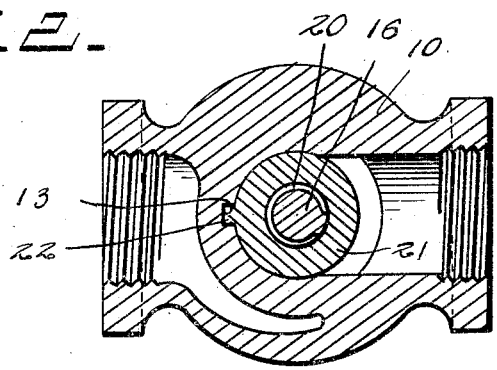
Figure 2 is a section on the line 2—2 of Figure 1.

Referring to this drawing, 10 designates the body of the valve which may be made of any suitable construction but is shown as provided with the vertically extending valve chamber 11 and with a valve seat 12 at the lower end of this chamber. The valve chamber is provided with the vertically extending key slot 13 along one wall. The bonnet 14 of the valve has screw-threaded engagement with the body of the valve as usual and disposed between the bonnet and the upper end of the valve chamber is the packing 15 which may be of rubber or any other suitable material. The bonnet and packing are, of course, annular to provide for the passage of the valve stem 16. This stem is provided midway of its length with the outwardly extending collar or shoulder 17 which rests within a recess 18 formed in the upper end of the bonnet. A packing nut 19 has screw-threaded engagement with the bonnet and extends over the upper end of the bonnet and over this shoulder 17 so as to hold the stem 16 in place from vertical movement to permit the rotation of the stem. The lower end of the stem is screw-threaded at 20 for engagement with internal screw-threads formed in the valve 21.

It will be obvious that by rotating the stem 16, the valve which is provided with the key 22 projecting into the key-way 13, will move vertically up and down toward or from the seat 21. The lower end of the valve 21 is preferably hemispherical as at 23 to fit against the seat 12. The valve proper 21 may be made of metal or any other suitable material.

It will be seen that with this construction, there is no friction between the seat 12 and the valve 23, but that the valve moves vertically and is held from any rotative movement so that there is no twisting action upon the valve seat nor any scoring or wear on the valve seat or on the valve itself.

Attention is particularly called to the fact that I have provided a ball seat, that is, the valve proper is globular at its lower end and that the seat 12 is formed to fit this globular valve. The shoulder 17 keeps the valve stem always in place. The seat 12 is relatively small and downwardly inclined so that nothing is liable to lodge on this seat and thus come between the valve and the seat.

I claim:—

A valve of the character described, comprising a body formed with a vertically extending valve chamber, a seat at the lower end of the chamber, a bonnet having screw-threaded engagement with the body, packing disposed between the bonnet and the body and extending across the upper end of the body, the upper end of the bonnet being formed with a recess, a stem extending through the packing and the bonnet and having a shoulder fitting within said recess, a cap nut having screw-threaded engagement with the bonnet and extending over the shoulder on the stem, the lower end of the stem being screw-threaded, and a valve disposed within the valve chamber and having interior screw-threads engaging the screw-threads on the stem, the valve having a globular lower end coacting with said seat, the valve and side wall of the chamber being splined to prevent rotation of the valve.

In testimony whereof I hereunto affix my signature.

JOHN O. WEBB.